(12) United States Patent
Courselle

(10) Patent No.: US 9,973,143 B1
(45) Date of Patent: May 15, 2018

(54) SOLAR PANEL ROOF MODULES

(71) Applicant: Daniel J Courselle, Camarillo, CA (US)

(72) Inventor: Daniel J Courselle, Camarillo, CA (US)

( * ) Notice: Subject to any disclaimer, the term of this patent is extended or adjusted under 35 U.S.C. 154(b) by 0 days. days.

(21) Appl. No.: 15/253,867

(22) Filed: Sep. 1, 2016

(51) Int. Cl.
| | |
|---|---|
| *H01L 31/052* | (2014.01) |
| *H02S 40/42* | (2014.01) |
| *H02S 30/10* | (2014.01) |
| *H02S 20/23* | (2014.01) |
| *H02S 10/12* | (2014.01) |

(52) U.S. Cl.
CPC ............ *H02S 40/425* (2014.12); *H02S 10/12* (2014.12); *H02S 20/23* (2014.12); *H02S 30/10* (2014.12)

(58) Field of Classification Search
CPC ........ H02S 40/425; H02S 20/23–20/25; H02S 30/10; Y02B 10/12
USPC .......................................................... 136/244
See application file for complete search history.

(56) References Cited

U.S. PATENT DOCUMENTS

| | | | |
|---|---|---|---|
| 4,010,773 A | 3/1977 | Moore | |
| 4,025,786 A * | 5/1977 | Hamilton | ............... H01L 31/042 136/244 |
| 4,373,308 A | 2/1983 | Whittaker | |
| 4,636,577 A | 1/1987 | Peterpaul | |
| 5,164,020 A | 6/1992 | Wagner | |
| 5,338,659 A | 8/1994 | Kauvar et al. | |
| 6,182,404 B1 | 1/2001 | Rinklake | |
| 6,453,629 B1 | 9/2002 | Nakazima et al. | |
| 8,739,478 B1 * | 6/2014 | Burtt | .......................... F24J 2/045 126/621 |
| 2009/0038668 A1 * | 2/2009 | Plaisted | .............. H01L 31/0521 136/244 |
| 2009/0095339 A1 * | 4/2009 | Nightingale | ............ E04D 13/00 136/244 |
| 2011/0162639 A1 * | 7/2011 | Jeandeaud | ............. F24J 2/4645 126/634 |

FOREIGN PATENT DOCUMENTS

| | | |
|---|---|---|
| CN | 201588500 | 9/2010 |
| CN | 203462665 | 3/2014 |
| DE | 4227929 | 3/1994 |
| DE | 19811399 | 9/1999 |
| EP | 1296104 | 3/2003 |

* cited by examiner

*Primary Examiner* — Matthew T Martin
*Assistant Examiner* — Dujuan A Horton

(57) ABSTRACT

The invention comprises solar panel modules with a central air passage, which allows air to flow through the modules, potentially powering wind turbines. The modules can be used as roofing material, and can easily replace existing roofing material. Embodiments of the modules can interlock easily, for strength and compactness. Embodiments of the modules can include one solar panel, or two solar panels, one below the other, and each optimized for certain light wavelengths. Embodiments allow the modules to connect easily to the underlying wiring system of a building. The owner of the modules can sell power back to an electrical grid, if enough power is produced. Other variations of the invention include an array of such panels mounted upon a roof or other structure. LED lights, batteries, and insulation in a compact configuration can be part of the invention.

16 Claims, 6 Drawing Sheets

SOLAR PANEL ROOF MODULES

DESCRIPTION OF THE RELATED ART

A solar cell, or photovoltaic cell (PV), is a device that converts light into electric current using the photovoltaic effect. Photovoltaic systems use no fuel, and modules typically last 25 to 40 years. Thus, capital costs make up most of the cost of solar power. Photovoltaic panels can therefore be mounted on residential and commercial buildings to capture sunlight and provide electrical energy for the buildings. In some cases, these solar cells have produced a surplus of energy that can be sold back to the electrical grid.

Thin-film solar panels have been developed, that are lighter and easier to install than previous versions of solar panels. A thin-film solar cell can have less than a quarter of the thickness of a regular solar cell. Thin-film solar cells can also be designed to absorb some forms of light, but be opaque or near-transparent to others. This makes them useful for being installed on the outside of a building.

Regular solar cells can also be designed to absorb some forms of light, but be opaque or near-transparent to others.

Some of the ways in which solar cells have been mounted on buildings include flat roofs, glazing, pitched roofs, and the facades of buildings. The most widely installed to date is an amorphous thin film solar cell integrated to a flexible polymer module which has been attached to the roofing membrane using an adhesive sheet between the solar module backsheet and the roofing membrane.

On pitched roofs, there are modules shaped like multiple roof tiles. In addition, solar shingles are modules designed to look and act like regular shingles, while incorporating flexible thin film solar cells. These extend normal roof life by protecting insulation and membranes from ultraviolet rays and water degradation by eliminating condensation because the dew point is kept above the roofing membrane. Facades of thin-film or regular solar cells can also be installed on existing buildings.

Semi-transparent thin-film solar panel modules can be used to replace a number of architectural elements commonly made with glass or similar materials, such as windows and skylights.

Efficiency of thin-film and regular solar panels limits the amount of power that they can generate. Many solar panels have efficiency of 8 percent; efficiency in this case means that if the panel is hit by 2000 watts of solar energy, and is 10% efficient, the panel will generate 200 watts of electricity. Few solar panels have greater than 19% efficiency.

For purposes of this application, the term "light" will be understood to mean all electromagnetic radiation radiating from the sun and reaching the surface of the Earth, including visible light, infrared light, and ultraviolet light, and other forms of electromagnetic radiation.

Sunlight consists of light of multiple wavelengths, including visible light, infrared light, and ultraviolet light, and others. These can all be absorbed by solar panels, but solar panels can generally not be optimized to absorb light of a large number of different wavelengths.

Depending on construction, photovoltaic modules can produce electricity from a range of frequencies of light, but usually cannot cover the entire solar range. Much of the incident sunlight energy is wasted by solar modules, and they can give far higher efficiencies if illuminated with monochromatic light. Therefore, another design concept is to split the light into different wavelength ranges and direct the beams onto different cells tuned to those ranges.

Some embodiments of the present invention include a concept by which an upper solar panel (called simply an upper panel) is optimized for light of one wavelength or group of wavelengths, and below that, a lower solar panel, called simply a lower panel, is optimized for light of another wavelength or group of wavelengths. Because this invention has multiple layers of solar cells, it can capture more energy than systems that have just one.

Some panels involve "scattered light", in which the light-receiving semiconductor surface is studded with aluminum nanocylinders. This causes the light to take a longer path within the light-absorbing semiconductor area, so that more light is absorbed, and the solar panel produces more energy.

These developments show that when light takes a longer path through the light-absorbing area of a solar panel, more energy can be absorbed, and when light passes through multiple solar panels, more energy can also be absorbed.

"Concentrators" can focus light on a solar panel for the solar panel to absorb more light and produce more energy. Concentrators can allow for greater efficiency of solar energy, according to studies by Boeing Corp.

In short, the solar panel construction of the current invention can serve as the entirety of the roof of the house or other building where the solar panels are installed.

Solar panels have been known for decades as a means for generating electricity, but it is often difficult to retrofit existing construction to include conventional solar panels. This is because conventional solar panels must be mounted over roof of a home or other building. They can also be damaged, because they are exposed to the elements on all sides.

Standard solar panel installations require mounting with special consideration to existing roofing materials, weight of panel load, span of supporting rafters or joists, wind load, snow, waterproofing and damage to 'tile' type of roofing. These considerations must be of concern and weighted to insure a quality installation and economically feasible for the lifespan of the project.

Solar panels installed on homes, or on top of buildings, sometimes carry additional problems, that may cause damage to the roof of the house where they are installed, or attached. Solar panels installed on top of buildings are also vulnerable to damage, and this has the potential to damage the buildings where they are installed, or attached. The method of installation of many solar panels means that the personnel installing them must drill holes in the roof of the building where the panels are installed. This is a problem with many of the solar panels presently offered for sale or lease, with reference to residential construction. Maintenance of conventional panels is also more difficult because maintenance personnel need to walk on the roof of the building where the panels are installed, to maintain the panels. The lifespan of the present, installed, panels is limited to the lifespan of the existing roofing materials they cover.

The present invention includes prefabricated solar panel modules, that can replace the roof or walls of an existing residence or other building and provide the same or an acceptable level of structural strength. The solar panel modules can each include multiple layers of solar panels, where each of the layers can be optimized for a specific light frequency or group of frequencies, and therefore, a solar panel module of the present invention can capture energy from light of multiple frequencies with greater efficiency.

The fact that the solar panel modules can be prefabricated in the same lengths as various types of construction members means that these solar panel modules can also be installed readily as part of new construction. Furthermore, in areas where existing construction is substandard (such as many third world countries), these solar panel modules of the present invention can replace old metal or other inferior roofing, and can produce power and lighting and add to the structural integrity of the existing construction. The solar panel modules described herein can also be maintained more easily than most conventional solar panels without further access to the roof.

The prefabricated solar panel modules of the present invention can also be placed in locations that have been hit by natural disasters such as hurricanes or earthquakes. Because they are prefabricated and self-contained, they can quickly be placed on the ground or on top of existing construction, and then they will produce electrical power that will either be stored in batteries, used on site, or released to the grid.

When wind or breeze blows against, and hits, a house or other structure, the wind will tend to go over and above the house. In addition, warmer air in general tends to rise. Some embodiments of the solar panel modules include an upper vent to allow air to flow from the outermost or lower end of a solar panel module upward to a vent near the top of the module, and to a wind turbine. A small wind turbine is at the second or "upper vent". This produces additional electrical energy when the wind hits the structure, passing through the lower vent, the wind will pass through the lower vent, through the module, and out of the upper vent, where it will power the wind turbine.

A dual barrier is created by the upper panel, on top, and the floor of the pan underneath, to prevent water from penetrating the system and possible causing damage to the structure, wiring, or other objects that need a dry condition.

This two-vent system allows water that might accumulate on the roof where the solar panel module is installed to flow out of the upper vent, and into the lower, first vent. This lower vent is covered by a screen or similar porous cover, called the vent screen (5), so that water can flow out of the vent screen and air can flow into the vent screen.

Some embodiments of the solar panel modules also include batteries, which will be charged by the solar cells and/or wind turbine. These are below the solar panel, where the batteries will be safe and dry.

Insulation can be installed below the panel system to protect the house or other structure from changing climate conditions. This layer may be below the batteries. The batteries and insulation are sufficiently lightweight that the combined weight of the solar panel modules, batteries, and insulation will not be significantly greater than the weight of many existing roofs.

INVENTIONS OF THE PRIOR ART

U.S. Pat. No. 4,010,773 by Moore discloses a structural array for solar cells, which also functions as the building roof, but that invention is structurally different from the present invention. First, Moore's invention does not involve the 2 solar panel structure that is an important part of the present invention. Moore's invention only involves one solar panel. Second, some embodiments of the present invention are designed to include components such as wind turbines, and to make it easier for those wind turbines to function. Third, the solar panel modules of the present invention are put together differently from those in Moore's invention.

U.S. Pat. No. 4,636,577 by Peterpaul explains a frame for holding solar panels. This frame only has the ability to hold one layer of solar panels, which is different from the present invention, which has two layers of solar panels. Furthermore, the present invention is designed specifically to work with existing construction, which the invention of U.S. Pat. No. 4,636,577 does not seem to be able to do.

U.S. Pat. No. 6,182,404 by Rinklake discloses a group of solar cells with channels for water drainage and ventilation. The channel structure is different from the structures for dealing with water drainage and ventilation proposed in the present invention. In addition, the present invention is designed to include two solar modules at different levels, unlike Rinklake's, and is also designed to be durable and to replace an existing roof, unlike Rinklake's invention. Furthermore, some embodiments of the present invention are designed to include batteries in close proximity to the solar cells, which is a feature not part of Rinklake's invention.

U.S. Pat. No. 6,453,629 by Nakazima et. al. discloses photovoltaic roof tiles. That is different from the current invention. FIG. 4 of Nakazima's patent shows that Nakazima's invention is designed to be placed on top of a roof, while the solar power modules of the present invention are designed to serve as the roof. The structure of the present invention is also different from the structure of Nakazima's invention.

U.S. Pat. No. 4,373,308 by Whittaker discloses a group of solar collectors. The drawings of Whittaker's invention make clear that Whittaker's invention is designed to be placed on top of the roof. The present invention serves as the roof. Furthermore, the solar cells in Whittaker's invention are small and circular, unlike the larger continuous solar panels of the present invention. The channels of Whittaker's invention are also oriented towards serving the small, circular solar cells of Whittaker's invention, while the channels of the present invention are oriented towards serving the larger continuous solar cells of the present invention.

Chinese Patent 203462665 describes a skylight that includes a photovoltaic panel. There are also a group of heat collection tubes connected to a water tank on the roof. The heat collection tubes heat up the water tank. There are also vertical rails. This is fundamentally different from the present invention, which has several parts designed to encourage air circulation, which improves the functioning of the present invention. The structure supporting the solar panels in the present invention is also different from the skylight in Chinese Patent 203462665. The structure supporting the solar panels in the present invention will serve as the roof of a building. Chinese Patent 203462665 does not appear to have this feature.

Chinese Patent 201588500 discloses a window with two panels that can move. This reduces the heat lost through the window, and is good for insulation. The structure supporting these panels is also very different from the present invention. The present invention includes more solid structural support than the invention of Chinese Patent 201588500, because the present invention is designed to serve as the roof of a building. Some embodiments of the present invention also include specific air ventilation features that improve the functioning of the current invention.

German Patent 4227929 describes rooftop tiles equipped with solar cells. These are different from the present invention because they are designed to fit on top of a roof and replace a roof tile, not a complete roof. The present invention, however, can replace a complete roof, and be structurally sound.

German Patent 19811399 describes rooftop solar cells and various things designed to keep them in place. Some of the connectors are U-shaped. Again, the solar cells in patent Ser.

No. 19/811,399 are designed to fit on top of a roof. The invention of German Patent 19811399 also does not include any ability to direct air flow. The current invention includes such ability.

European Patent 1296104 discusses an array for holding solar panels in place. This is very different from the structure of the present invention, and lacks some of the capabilities of the present invention, such as the ability to direct air flow in a way that helps wind turbines to generate additional electricity. U.S. Pat. No. 5,164,020 by Wagner discloses a type of solar panel, but that is substantially different from the present invention. Among other differences, the solar tiles involve more components, and are therefore harder to fabricate, than the modules of the current invention. The space between the tiles is also designed for a wire raceway, not an air passageway. Wagner's invention would probably also result in heat buildup in the attic of a house where it is used, while our invention takes care to avoid this.

SUMMARY OF THE INVENTION

This application claims priority from U.S. Provisional Application 62/282,252, with Daniel Courselle as the inventor. This provisional application is hereby incorporated by reference in its entirety.

Principles Governing Solar Power

Roofs

Term Numbers

The following term numbers will refer to different parts of the invention. Solar panel module (1). Joist (3). Central air space (4). Vent screen (5). Pan (6). Length beam (7). Screw (8). Anchor strips (9). Battery (10). Insulation patch (11). Anchor (12). Bearing member (14). Wind turbine (15). Lower panel (16). Mesh-containing basin (18A). Meshless basin (18B). Upper Opening (20). Air Direction Panel (21). Main wire (26). Straightener (27).

The solar panel modules can be used to create air flows to power turbine blades. The air flow within the pan moves free air up from the vent screen (5) of the pan (6) creating a funnel. The vent screen (5) is a covering for the lower vent, comprised of wire mesh of a type similar to what is inside a screen door, or another substance that allows air and/or water to pass through the vent screen but does not allow other things such as insects to pass through easily. This free air flow is then directed to another opening within the upper portion of the pan, the upper opening (20), which allows the air to flow out of the higher end of the solar panel module. The upper opening may also be covered by a screen or a similar covering to the vent screen. Wind sources above the solar panel module, and also the air flow in the pan, are freely allowed to flow into the upper wind turbine's apertures. This combination of air creates pressure on, and movement of, the turbine blades, which generates electricity.

The present invention would be ideal for incorporation into new construction, such as new houses, and especially conditions such as garages without an attic or enclosed ceiling, separated by a firewall enclosing the building envelope.

The present invention could be incorporated onto other construction, such as carports. For example, solar panel modules of the present invention can be placed on top of a carport.

Solar panel modules must withstand rain, hail, heavy snow load, and cycles of heat and cold for many years. Therefore they must be made of materials that can withstand these things. The solar panel modules of the current invention can be made of materials that fulfill these requirements. For example, the pans can be made of materials such as metal, including but not limited to aluminum, and also fiberglass, plastic, or laminates.

Solar power allows for greater efficiency than burning fuel to create heat, such as the generation of energy in heat engines. The drawback with heat engines is that most of the heat created is lost to the surroundings. Thermal efficiency is as defined:

$$\eta_{th} \equiv \frac{W_{out}}{Q_{in}} = 1 - \frac{Q_{out}}{Q_{in}}$$

In order for solar panels to become more efficient and therefore more useful in the future, researchers across the world have been trying to develop new technologies to make solar panels more effective at turning sunlight into energy.

Roof-mounted solar power systems consist of solar modules held in place by racks or frames attached to roof-based mounting supports. In the case of photovoltaic external sunshade applications, east or south façade and panel slope of 30-40° are the most suitable location and inclination.

In a grid connected rooftop photovoltaic power station, the generated electricity can be sold to the grid at a price higher than what the grid charges for the consumers. This arrangement provides payback for the investment of the installation. Many consumers from across the world are switching to this mechanism owing to the revenue yielded.

Rapid fluctuations of generation from photovoltaic systems due to intermittent clouds cause undesirable levels of voltage variability in the distribution feeder. At high penetration of rooftop photovoltaic panels, this voltage variability reduces the stability of the grid due to transient imbalance in load and generation and causes voltage and frequency to exceed set limits.

If the photovoltaic panels making up the roof-mounted systems are more efficient, the building owners can sell more power back to the grid. This leads to more revenues for the homeowners. If the solar panel roof modules contain multiple solar panels optimized for specific wavelengths, then the solar panel roof modules would be able to yield more power from the solar energy hitting them.

For purposes of this application, when describing the location of solar panel module components relative to each other, the amount of distance above the bottom of a solar panel module that a component is located will be referred to as the "height" of that component. A component that is "higher" than a second component will be located further above the solar panel module than the second component.

The Preferred Embodiment

The structure of the solar panels is designed to convey heated air.

The pan (6) includes two types of basins, the mesh-containing basin (18*a*) and the meshless basin (18*b*). The mesh-containing basin includes the opening which contains the vent screen. The meshless basin does not. It is important to note that an embodiment of the present invention can contain a solar panel module that has as many different meshless basins as desired by the user, as long as the shape of the mesh-containing basin and all the meshless basins combined and assembled together is the prescribed shape for the pan (6). However, the versions of the solar panel modules displayed in the drawings will include pans that comprise one mesh-containing basin and one meshless basin.

The two longer walls of the pan will generally be parallel to each other, and at about a 90 degree angle to the bottom of the pan. The two smaller walls of the pan will generally have 90 degree horizontal angles with the longer walls, but will make greater than 90 degree angles with the bottom of the pan. For this reason, some embodiments of the pan may seem trapezoidal, with the two longer walls forming the straight boundaries of the trapezoid, and the two smaller walls forming the diagonal boundaries of the trapezoid.

The meshless basin and mesh-containing basin interlock together as follows in the primary embodiment: Both basins contain lips, and the meshless basin is designed with a slightly higher lip. The meshless basin is also slightly narrower than the mesh-containing basin. Therefore, the meshless basin can be slid into the mesh-containing basin, and its lips will slip over the lips of the mesh-containing basin. The two basins can then be pasted together with epoxy or another fastening substance on their lips, and potentially also on the parts of their sides that contact each other. Therefore, these two components will interlock. This is a characteristic of the preferred embodiment. Additional features such as hooks, snap-fits, or any component of the prior art that can further strengthen the connection between the mesh-containing basin (18a) and the meshless basin (18b) can be added, and connected to the parts of both basins that contact each other.

This interlocking of the different solar panel modules can create a weatherproof seal.

One important embodiment of the solar panel modules (1) comprises a waterproof solar panel called an upper panel (2), held to a pan (6) by two anchor strips (9), which are fastened to the lips of the pan (6) by screws (8). These screws also go through the pan lips into the joist of the underlying house or other structure. Alternatively, the anchor strips can include peg-like components, that will go through the pan lips into the joist of the underlying house or other structure. This completes the enclosed space inside the pan (6). The upper panel (2) faces the sky so that it can absorb sunlight. The lower panel (16) is on the bottom of the tray and absorbs energy from the sunlight that the upper panel may have failed to absorb. The central air space (4) is in between the upper panel and lower panel.

On one end of the pan (6), the vent screen (5) rises up at an angle from the bottom of the pan (6), or the lower panel (16) in embodiments which include the lower panel. This enables air to flow in through the screen intake, and ventilate the inside of the pan. In some embodiments of the invention, this allows for ventilation of batteries or anything else that might be fixed to the inside of the pan. The location of the vent screen (5), when ultimately installed in a building, will generally be in a position where air flow will be directed through the vent screen, into the pan, and out of the pan through the upper opening where the air flow will power a small wind turbine. For example, if the solar panel modules of the present invention are installed as the roof of a house, with the vent screen (5) projecting in the roof overhang above the wall of the house, as in FIG. 2, then air hitting the side of the house will be directed towards and through the vent screen (5).

This directed air circulation allows for air to be moved into the pan, and then to circulate out through a hole (The upper vent) in the upper part of the pan, or the upper panel (2), so that the circulating air can create an air current that will power a small wind turbine (15). This upper vent may also be covered with a screen.

The fact that warm air rises generally may also help the aforementioned air circulation. As air inside the pan becomes warmer, it will rise to the top of the pan and come out through the upper vent. This can also help to power the aforementioned wind turbine (15). The upper vent and wind turbine are characteristics of the preferred embodiment.

The vent screen (5) may also be removable, and filtered, so that it can be removed to facilitate cleaning of the pan. This is a characteristic of the preferred embodiment. The vent screen may be designed to slide out on grooves when needed, or be removed by another method. Each vent screen can also have both grooves and a small locking mechanism or snap-fit on it, which can be undone by the user when needed, so that the vent screen will not accidentally slide out of the pan. The lips of the pan rest on joists (3).

In other embodiments of the invention, the lips of the pan rest on length beams (7) with side walls thickened, that are part of the solar panel module but not part of the underlying structure.

In some embodiments of the pan, the right lips of (18a) and (18b) will both be slightly higher than the left lips of (18a) and (18b), respectively, so that when two pans are placed next to each other, the right lip of the mesh-containing basin and meshless basin of the pan to the right will be able to slide over the left lip mesh-containing basin and meshless basin of the other pan to the left. Therefore, a long row of the pans can be placed next to each other, and can interlock in this manner. This is a characteristic of the preferred embodiment of the invention. This can also create a weatherproof seal, when installed on a building.

The long row of the pans may also be fastened to each other by epoxy or by another method such as interlocking hooks. This will increase the structural stability of this long row of pans.

In other embodiments of the pan, the right lips of (18a) and (18b) of the pan to the right will not be higher than the left lips of (18a) and (18b) of the pan to the left.

The pans can be created by aluminum or fiberglass extrusion, and by other methods. The inventor believes that aluminum, plastic, or fiberglass extrusion will be the cheapest method.

Some embodiments of the invention will involve creating the pans through aluminum or fiberglass extrusion, and creating them in a way that will allow the solar panel modules to be electrically grounded.

In one embodiment of the invention, the pan, upper panel, and lower panel, and joist on one side of the pan are each gripped lengthwise by an anchor (12). The suggested structure of the anchor is for it to have two indents on opposite sides, and another plate or other weight as part of the anchor, above the two indents. The additional force exerted by the plate or weight keeps the indents in the correct position. The anchor strips (9) can serve the function of this plate, in embodiments where they are used, or the plate or weight may be built into the anchor.

The anchors can grip the edges of the pan, upper panel, and lower panel, in the indent. The fact that the anchors each have two indents, and each indent is indented in the opposite direction from the other one, means that the anchor can grip the pan, upper panel, and lower panel of two solar panel modules, side by side, at the same height.

Anchor strips do not necessarily have the indents that anchors do.

The anchor (12) in another embodiment can also be connected to a joist that makes up part of the underlying structure, via screws that are driven through the anchor, and are driven into the joist. The screws can be spaced every 18 inches on certain embodiments, which gives structural support to the invention. Each anchor in the group can each hold the pan, upper panel, lower panel, and the length beam of a different solar panel module in each of its indents. The preferred embodiments of the invention will have anchors, or anchor strips.

In another version of the invention, the indents of the anchors grip the upper panel and lips of the pan. means that the anchor can grip the upper panel and lips of the pan of two solar panel modules, side by side, at the same height.

Depth of the Pans

In one version of the invention, the pans will be approximately 3.5 inches deep, and also the anchor (1) will be 1.5 inches wide at its top, running the length of the pan lip, and the parts of the anchor that hold down the upper panel have a continuous indent and will be 5/8 of an inch wide. Other versions of the invention, where the pan has a different depth, are also possible. It is also possible for the upper panel to be curved slightly, made of a prism sheet material, or be otherwise designed to magnify light, or light of specific wavelengths, before it reaches the lower panel. This will increase the energy produced by the lower panel. Alternatively, some other means for magnifying the light may be placed between the upper panel and the lower panel.

The solar panel modules can easily be manufactured in "2×2", "2×4", and "2×8" sizes, which refer to 2 feet by 2 feet, four feet by four feet, and four feet by eight feet, respectively. These are standard sizes of construction boards used in the U.S. and many other countries. The modules can also be made in lengths of 2, 4, 6, 8, feet and perhaps other sizes. The solar panel modules can also be made 32 inches wide, or perhaps other widths. These are the standard lengths of construction board in the United States and Canada. The inventor has developed a "2 by 4" prototype of the invention.

The solar panel modules can also be made 36 inches long and/or 36 inches wide. The design of the solar panel modules will allow them to be made in almost any size that is needed, and the principles behind the design will remain the same. The basic description of the solar panel modules will remain the same, too. Therefore, versions of the solar panel modules of the current invention, that are larger or smaller than those directly discussed above, are also explicitly included in the current invention. For example, a 40-inch-wide version of the solar panel module of the current invention can be constructed using the description contained herein.

The solar panel modules of the invention are designed to comply with U.S. and Canadian construction standards.

The solar panel modules are designed in a way that different solar panel modules embodying the current invention can have different lengths, and different widths, and still function with the same efficiency. All of the components of the solar panel modules described herein are scalable, and the solar panel modules themselves are scalable. Therefore, the solar panel modules described herein can be used easily to substitute for construction boards, when building new houses or other construction.

Modules of the present invention can also use the system similar to Solar3D, which uses solar panels equipped with multiple pillars in their light collecting areas, which collect a higher percentage of the light energy hitting the panels than would otherwise be collected. The upper panel can include a prism sheet on its top, which would absorb the light rays optimized for a certain group of related wavelengths of light. Then, the lower panel can be optimized to absorb the light passing through the upper panel of a different group of related wavelengths.

Modules of the present invention can also use prism sheets, to increase the absorption of the light hitting the solar panels. The upper panel can include a prism sheet on its top, which would diffract the light, and the upper panel can be optimized for absorption of a certain group of related wavelengths of light. Then, the lower panel can be optimized to absorb light of a different group of related wavelengths. This can potentially result in more energy production than the use of regular solar panels, because many regular solar panels will optimally produce energy from a group of related wavelengths of light, and not other wavelengths.

A prism sheet can also be fit into the solar panel module immediately below the upper panel, at a location in between the upper and lower panels, or on top of the lower panel.

Including any of these features will not require a redesign of the invention.

The current invention can work well with thin-film solar cells, because thin-film solar cells can fit easily into the locations of the upper panels and lower panels. In addition, ether the upper panel, lower panel, or both, can include aluminum nanocylinder, to allow greater efficiency in collecting sunlight and turning it to electricity. This will not require a redesign of the invention either.

Thin-film solar cells comprising a material that can be "sprayed" onto a surface, and function as a solar panel thereafter, are being developed, or have been developed. The current invention can function with these "spray-on" solar cells. The solar cell material can be sprayed onto the location of the upper panel, lower panel, any intermediate panels, or all of these, and will function as a solar cell thereafter, allowing the invention to serve its intended purpose without any redesign.

The preferred embodiment of the invention (The solar panel module (1)) will also work in conjunction with additional features beneath the solar panel module. Between the joists, and underneath the solar panel module (1) can be one or more batteries, which are operatively connected to the said upper panel and lower panel so that these can produce electrical energy to be is stored in the batteries. Insulation would be adhered to the bottom of the pan, in some embodiments. Batteries could also be housed underneath the pan, in competition with the insulation. The batteries will be attached to the joists in a way that the joists can support their weight, as well as the weight of the primary embodiment. That will mean that the joists support the dead weight of the batteries and panels.

The main wires (26), from most embodiments, should pass through to an attached waterproof chamber, below the pans, or may be in a separate tray at the same level as the trays supporting the batteries. This waterproof chamber may contain connections to other electrical components, or solar inverters to complete the home power system, or connections to an electrical power grid.

It is important to note that the walls of the pan, upper panels, and lower panels should all be waterproof, and that the main wires should be in waterproof housing. The main wires should be housed within the wall of the pan. The tray containing the batteries should also be waterproof.

A Second Embodiment

In a second version of the invention, the anchor strips are attached directly to pegs that are inserted into the joists. The anchor strips are also attached to straighteners that hold the upper panel. Each of the pans has lips that fit over the joists. These lips are designed so that the right lip of one pan will fit over the left lip of the pan immediately to its left. The peg will be driven through both lips. Therefore, the peg keeps both pans in place by holding the lips of both pans to the joist. Each peg will hold the right lip of the pan to its right atop the left lip of the pan to its left, and attach both to the joist. The straighteners hold the upper panel, and they are attached to the peg, which is attached to the anchor strip. The peg, straighteners and anchor strip hold the upper panel and the pan in place in this manner.

Because the right lip of each pan is consistently on top of the left lip of the pan to the left of it, and the right lip of each pan is at the same height as the right lip of each other pan, and the left lip of each pan is at the same height as the left lip of each other pan, the pegs and modules can all be level with each other.

The rest of the pan protrudes out below the straighteners. The lower panel is below the straighteners.

Components Underneath the Solar Panel Module

Between the joists, and underneath the solar panel module, is a wall or other insulation layer. Underneath this is one or more batteries, which are operatively connected to the upper panel and lower panel so that these can produce electrical energy which is stored in the batteries. These should be used in conjunction with the preferred embodiment of the solar panel modules.

Underneath the batteries is another wall, and below that is an insulation layer. This is part of the preferred configuration of the invention.

This structure allows the dwelling to be protected by the solar panel modules in the way that the dwelling would be protected by a regular roof. It also means that the owner or developer of the underlying building may be able to save money by installing the solar panel roofing modules as the roof of the underlying building, instead of installing them on top of the existing roof of the underlying building (and paying for both the roof and the modules).

More Information about the Wind Generator

The wind generator (wind turbine) could also be designed with blades on two sides, and a generator in the middle, connected to the two blades. These blades will be facing two different directions. This way, air current flowing up from the upper vent will cause the first blade to move, transmitting mechanical energy to the generator, which will generate electricity, and air current flowing from another direction will cause the second blade to move, transmitting mechanical energy to the generator, which generates electricity. This is part of the preferred embodiment.

In a third embodiment of the invention, the pan and panels are angled directly upward and air blowing in through the vent screen (5) is conveyed directly to a wind turbine (15) at the uppermost end of the pan. The air then blows through the turbine, producing electricity. The air will be inclined to blow in this direction because wind hitting the structure will be inclined to go over and around it, which, in practical terms, means that this wind will tend to go through the vent screen (5). When the wind hits the vent screen, it has been compressed, and so it is more likely to go through the vent screen. While the air comes in through the vent screen (5) and flows towards the upper vent, the air picks up heat from the solar panels. The air then rises towards the upper vent.

In addition, the wind turbine (15) can be designed so that any air flow that goes above the structure entirely can be caught by another (the second) blade of the wind turbine (15) and used to generate electricity.

Furthermore, in general, warm air rises, and so air inside the pan which rises will go upward and through the upper vent to power the wind turbine (15).

In a fourth version of the invention, the joists and/or the upper panels of the first embodiment have LED lights at the bottom. This allows the property-owner to have light as needed, decorate his property or send whatever message he chooses. In a fifth embodiment, the pegs of the second embodiment have LED lights at the top, which fulfill the same functions as the LED lights in the fourth version of the invention.

In another embodiment of the invention, the anchors have LED lights at the top. The anchor strips have LED lights at the top in still another embodiment.

Most embodiments of the solar panel module have the additional feature that the only wiring coming out of the upper solar panel is one positively charged wire and one negatively charged wire near the top. The lower solar panel also has one positively charged wire and one negatively charged wire near the top. These wires will transmit out the electricity generated by the panels. This makes the solar panel module embodiments "clip-in", so that a user can easily install them in an existing structure without rewiring the structure. This is part of the preferred embodiment.

One way to accomplish the structure of the preceding paragraph is for two main wires to be run down from the upper panel through the back wall of the pan, to the lower panel, where the two main wires will be connected to the lower panel and then will protrude further below the pan, and be connected to the underlying electrical system of the building. The 2 wires connected to the upper panel will be the same as the 2 wires connected to the lower panel, in this case.

Alternatively, two small connecting wires (one positive, one negative) can be run through the back wall of the pan from the lower panels to the positive and negative main wires, respectively. If there are more than two solar panels in the module, two small connecting wires (one positive, one negative) can be run through the back wall of the pan from the lower panels to the positive and negative main wires, respectively.

The main wires can also be run through the upper vent, with small positive and negative connecting wires between the main wires and each of the solar panels in the invention.

A homeowner can also maintain embodiments of the invention with these characteristics more easily than other solar panel products because the homeowner can get access to the panels from underneath because of their clip-in nature. For example, if the solar panel modules are installed over a garage, the homeowner can access the modules, and all the wires coming out of them, through the ceiling of the garage. A homeowner can do the same thing with solar panel modules attached to a carport. In general, it is easier to get access to these solar panel modules from below. Conventional solar panels are still accessed from on top of finished roofing. Accessing the solar panels of the present invention is also less dangerous, because there is less of a chance of a worker falling off a roof or experiencing other problems.

The eighth embodiment of the invention has more than two solar panels inside the tray, arranged one panel below the other. These panels can therefore absorb more electrical energy from the sunlight reaching the module, because each panel can be optimized for a different group of related wavelengths of light. All of the panels can be connected to the two wires that hang down from the tray, because small connecting wires can be easily run from each of the additional solar panels to the two main wires. Positive connecting wires will be run from each of the additional solar panels to the positive main wire, and negative connecting wires will be run from each of the additional solar panels to the negative main wire in a junction box. Alternatively, the main wires can be designed to connect directly with all of the solar panels.

A ninth embodiment of the invention will not have a lower panel, but will have the upper panel as the only solar panel in the invention. The lower panel may be replaced by a material such as aluminum or fiberglass. This version of the invention might be more useful in certain circumstances, such as for housing other electrical components.

The embodiments listed here, including all required wiring, will usually weigh the same amount as, or less than, a tile roof.

A large number of solar panel modules can form an array, with the right lips of the mesh-containing basin and meshless basin of one module on top of the left lips of the mesh-containing basin and meshless basin of the module to the left. This can create a weatherproof seal, which helps the solar panel modules' usefulness as roofing material.

The lips can also form a continuous bearing flange, when the solar panel modules are arranged in this fashion. Each pan can rest on the joists.

Some versions of the solar panel modules will also include a drainage channel, which will run from a point directly below the upper opening to the vent screen (5). The drainage channels might be at other points in the invention. Alternatively, the drainage channels can be on top of the modules, or on top of the anchors or anchor strips.

Some embodiments of the invention use graphene wires instead of copper wires, because some types of graphene are better electrical conductors. This may decrease the amount of electricity lost to resistance in the wires, and increase the amount that is delivered to the building and the grid, and reduce consumption of copper.

The solar panel modules are designed to comply with the Uniform Building Code and the National Code with reference to construction. Any joist, bearing members, or length beams that supports the solar panel modules should comply with these two codes. Joists, bearing members, or length beams that do this are part of the prior art.

The solar panel modules and the joists or length beams can constitute a bearing weight for the underlying structure.

A large number of the solar panel modules, located side by side, may also require a cross-bracing structure, underneath them, to limit the effect of shear forces caused by the panels jostling against each other.

Further Embodiments

Some compatible embodiments of the invention include a "mounting board" installed elsewhere, which holds electrical components connecting the main wires of the primary embodiment to storage batteries servicing lighting, equipment, and tools, and which controls the batteries and solar panel modules. The mounting board can be connected to the solar panel modules via the main wires. This mounting board can be installed on the user's garage or another part of the user's dwelling. Batteries may be located outside the user's dwelling completely, in a separate compartment placed on the ground or a separate building.

In another variation of the invention, the space between the solar panels, inside the pan, can contain another item. This item can have any of several different functions.

The solar panel roofing structure described in the current application can be used to easily replace the metal roofs of gabled metal houses. The solar panel modules will probably not weigh much more than the metal roofing gables, and will probably catch a large amount of sunlight, because these solar panel modules may be able to directly face the sun during part of the day.

Another compatible embodiment of the invention utilizes a solar inverter connected to the main wires. This changes the DC electricity produced by the upper and lower panels, and any other solar panels connected either directly or indirectly to the main wires, into AC electricity.

The invention can also be used to charge electric cars. Electric cars use a substantial amount of electricity. The mounting board can be connected to the solar panel modules and the batteries, where power from these sources can be used to charge an electric car, which may be plugged into an outlet on the mounting board.

Alternatively, in the future, the solar panel modules of the present invention, and a small wind turbine (15), may be placed on top of an electric car and connected to the batteries of the electric car. The solar panel modules may be connected to the battery via their main wires. Then the solar panel modules will produce electrical energy and recharge the electric car's battery whenever sunlight is available. The wind turbine will produce electrical energy and recharge the electric car's battery whenever wind is blowing past the electric car, and potentially also whenever the electric car is moving, because when the electric car is moving air will be forced through the vent screen and upper vent, and into the wind turbine. The wind turbine would then generate power which could be used to power the electric car.

In the future, it may be possible to design a tall building such as a skyscraper with rows of solar panel modules of the type described herein along its sides, up to the top, or near the top, of the building. Sunlight can be absorbed by these solar panels, and can produce energy, when sunlight hits the building. When wind hits the building, it will be forced to go upward and around the building. This will produce air flow through the vent screens, and also air flow along the outer surface of the solar panel modules. These two air flows can power small wind turbines (15) that are attached to, or placed close to, the solar panel modules. A skyscraper using solar panel modules and wind turbines in this manner will have substantially lowered energy costs, and may be able to produce enough power to generate a profit by selling power back to the grid.

It is possible to design a building such as a skyscraper, or another building involving large numbers of windows, where every second panel of the outer covering of the building is a solar panel embodying the current invention, and every first panel is a window, which allows natural light to come through. Solar panel modules that are two feet wide may be used for this purpose, or solar panel modules of another width may be used for this purpose. In addition, the user may choose to design the building with every third panel being a solar panel module of the current invention, or every fourth panel, etc. The user may choose to design the building with every third panel being a window, or every fourth panel, etc. A building may also be designed with some panels of the outer covering being solar panel modules, of the current invention, some panels being windows, and some panels being something else.

Method of Installing the Solar Panel Modules

Including a mounting board with a charging outlet connected to the solar panel modules, and the ability to control the batteries, can be accomplished with a division of labor. A roofing contractor would install the solar panel modules, while an electrician would install the wiring in the user's garage or another area.

The discussion included in this patent is intended to serve as a basic description. The reader should be aware that the specific discussion may not explicitly describe all embodiments possible, and alternatives are implicit, or obvious to those skilled in the art. Also, this discussion may not fully explain the generic nature of the invention and may not explicitly show how each feature or element can actually represent equivalent elements. Again, these are implicitly included in this disclosure. Where the invention is described in device-oriented terminology, each element of the device implicitly performs a function. It should also be understood that a variety of changes may be made to the embodiments that have been described, without departing from the essence of the invention. Such changes are implicitly included in the description. These changes still fall within the scope of this invention.

The reader should also understand that components that perform the same functions, within the invention, as the components described herein are explicitly within the scope of the claimed invention.

Furthermore, each of the various elements of the invention and claims may also be achieved in a variety of manners. This disclosure should be understood to encompass each such variation, whether it is a variation of an apparatus embodiment, a method embodiment, or a variation in any element of an embodiment. As the disclosure relates to elements of the invention, the words describing each element may be replaced by equivalent apparatus terms, even if only the function or result is the same. Such equivalent, broader, or even more generic terms should be considered to be encompassed in the description of each element or action. Such terms can be substituted, when desired, to make explicit the implicitly broad coverage to which this invention is entitled. It should be understood that all actions may be expressed as a means for taking the action in question, or may be expressed as an element for causing the action in question. Similarly, each physical element disclosed should be understood to encompass a disclosure of the action which that physical element facilitates. Such changes and terms are to be understood to be explicitly included in the description.

Some Additional Uses of the Invention

The solar panel modules discussed here could easily be used to replace metal, gabled, roofs, on existing buildings. The solar panel modules weigh about the same as certain kinds of metal roofs, as discussed elsewhere in this application.

The solar panel modules could also potentially be placed on top of buildings that are not presently connected to an electrical grid, or that have poor connections to the electrical grid. The solar panel modules can then generate power for these buildings, potentially creating access to electrical power in areas that never had access to electrical power before.

It would be possible, with the invention described herein, to create a housing subdivision where every house has a garage with a roof comprised of the solar panel modules of the present invention and there is an additional vacant lot, within the subdivision, with a collector or storage system for this lot. The solar modules on top of the garages would produce energy, which would be used by the houses in the subdivision. Each of the houses would have a connection to the collector through which electrical power could be moved from the house to the collector lot, and moved from the collector to the house when needed. Such a connection may be created when the subdivision is built, may utilize the existing wires from the power grid, or may be created by a different method. Any surplus energy produced by the solar panel modules would be stored in the collector. This energy would be available to the homeowners when needed, such as days when cloud cover reduces the amount of sunlight reaching the solar panel modules. This energy could also be sold back to the power grid, with any revenues presumably divided between the homeowners according to a contract between them, or perhaps homeowners' association rules. A homeowners' association from a subdivision designed in this manner may be able to use profits from electricity sold back to the grid to partially or fully replace income from homeowners' dues, thus eliminating or reducing homeowners' dues.

Solar panel modules of the current invention could potentially be placed over canals, aqueducts, and flood control channels of the type that now exist in California. The solar panel modules would generate electricity there, without affecting the water flowing below. Solar panel modules of the current invention could also be placed on the floors of flood control channels. Most of the time, a flood control channel does not have water flowing through it. Therefore, the sunlight that reaches the channel will hit the ground, and can be absorbed by solar panels that are part of solar panel modules placed on the ground.

Solar panel modules of the current invention can also be placed within road surfaces, footpaths, or bicycle path surfaces, where they will be able to face the sun and generate electricity. The solar panel modules would be laid flat beneath the surface of the road. The upper panels of the solar panel modules would be close to the surface of the bike path or road, and a protective surface would be above the upper panels. It would probably be necessary to reinforce the solar panel modules if they were part of a road where automobile traffic occurred.

Embodiments of solar panel modules of the current invention can be used to control the amount of sunlight that reaches crops, and their temperature. The crops' temperature can be controlled by the solar panel module as it allows a specific amount of infrared light to reach the crops. The solar panels will store some of the sunlight reaching them as electrical energy in a battery. Any attached wind turbine (15) will also produce electrical energy to be stored in a battery. The solar panels can be designed to only allow a certain amount of visible light, infrared light, or another part of the electromagnetic spectrum through. They can also be connected to a processor that is programmed to monitor the amount of different categories of electromagnetic radiation that are actually received by the crops. If the crops receive too little light, heat, etc., then the processor can use the electrical energy stored in the batteries to power lamps that will radiate the necessary light, heat, etc. towards the crops so that the crops can absorb the light, heat, or other electromagnetic radiation.

A small metal building with strawberries growing inside it may be effective for this purpose. This invention could also be used with other crops, using the methodology discussed above.

Some crops may also be grown hydroponically, using the method outlined above.

The invention discussed here reduces the influence of climate on the ability to grow crops, because the invention discussed here allows the user to partially control the climate in which crops are grown by controlling the amount of light and heat hitting the crops.

With larger plants such as those found in orchards, a farmer can place solar panel modules of the current invention 2 feet above the plants, or trees. This allows the farmer to generate electricity and to partially control the amount of light and heat reaching the plants.

BRIEF DESCRIPTION OF THE DRAWINGS

FIG. 3 comprises an exploded view of the whole embodiment of the solar panel module (1).

DETAILED DESCRIPTION OF THE DRAWINGS

Figure 1:
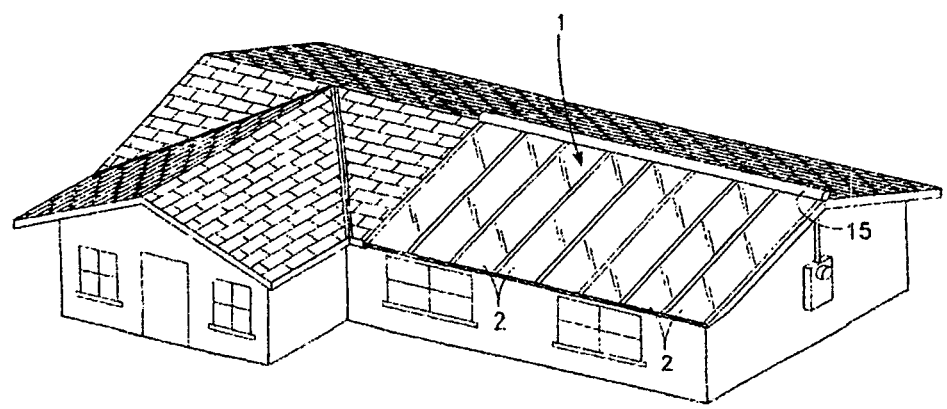
FIG. 1 shows a perspective view of an example of a house with solar panel modules of the current invention on its roof.

FIG. 1 shows a perspective view of an example of a house with solar panel modules of the current invention on its roof. The upper panels (2) of many of the solar panel modules can be seen. The anchors can be seen in between these upper panels. A wind turbine (15) is also visible on the roof of the house.

Figure 2:
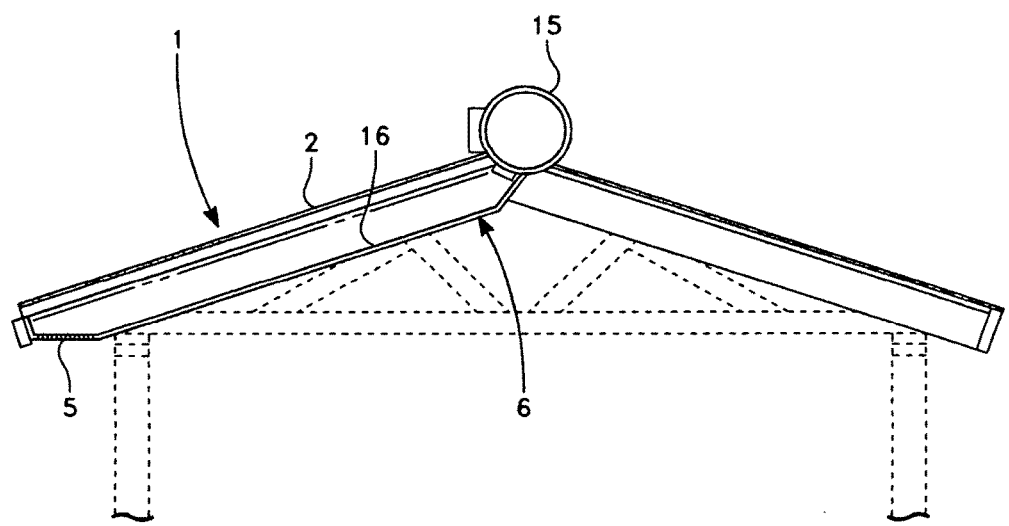
FIG. 2 shows an example of a house with solar panel modules of the current invention on its roof on one side.

FIG. 2 shows an example of a house with solar panel modules of the current invention on its roof on one side. Some of the structure of the house is in dotted lines and forms no part of the claimed invention. The wind turbine (15) can be seen on top of the house, and an example of the upper vent is shown, blowing air into the wind turbine (15). Air gets into the solar panel module through the vent screen (5) and flows through the pan (6) to the upper vent. The viewer can also see how the wind turbine (15) also takes advantage of the air flow over the house. The solar panel modules are the roof materials of one side of the house, in this case. Joists are shown between the pans of the current invention. The upper panel and lower panel of one of the solar panel modules can be seen, and it is clear how sunlight will reach both the upper and lower panels, which can then absorb the sunlight. A cross-section of the pan can be seen, and it is clear how the contours of the pan cause air to go up through the upper vent once the air enters the pan.

On the other side of the roof, sheeting and roof material can be seen on top of the joist.

Figure 3:
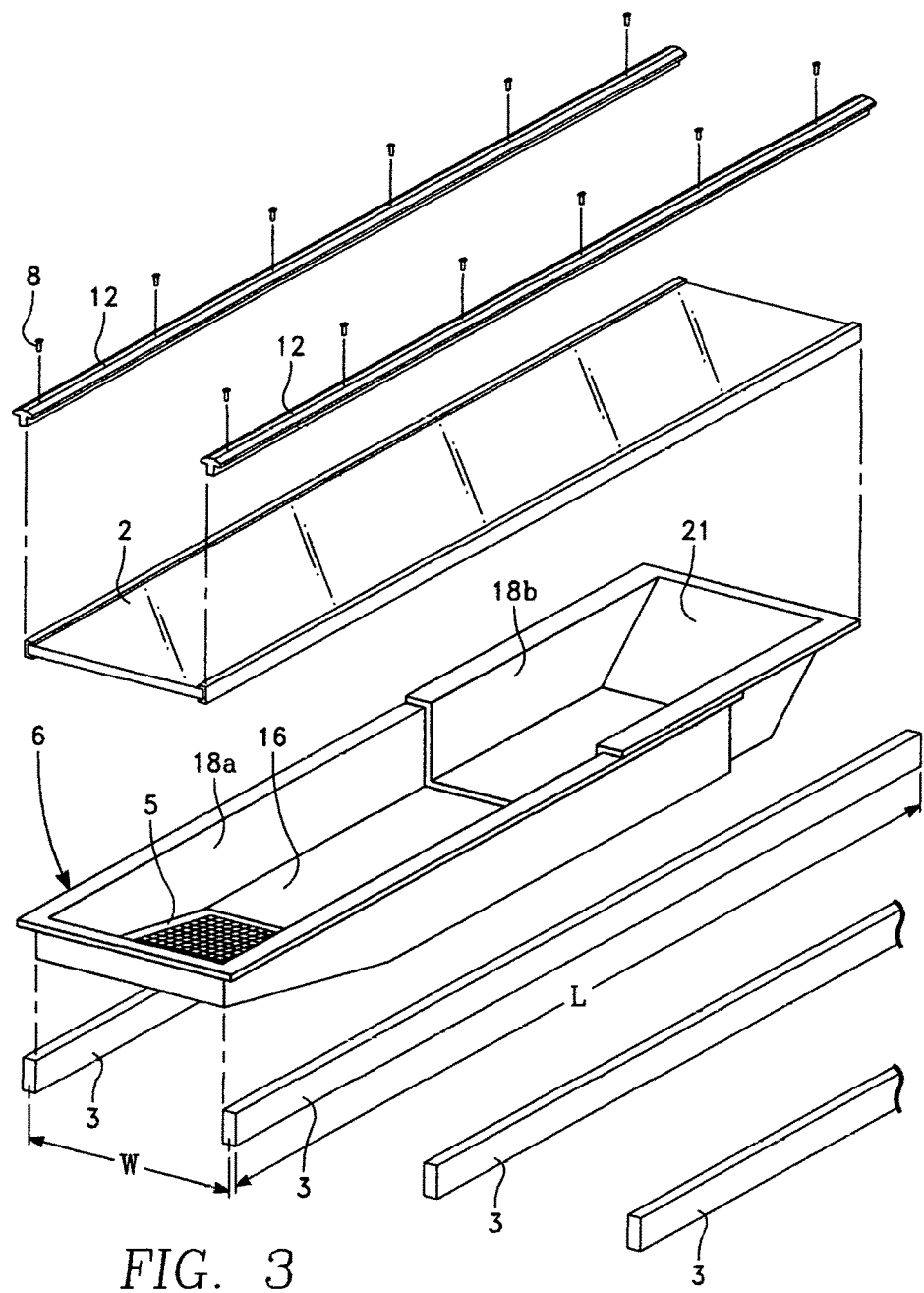
FIG. 3 shows an exploded view of a solar panel module of the primary embodiment.

FIG. 3 shows an exploded view of a solar panel module of the current invention. The pan in this solar panel module has one mesh-containing basin and one meshless basin. The anchors and screws are placed above the upper panel and hold it down against the pan. The pan can be clearly seen divided into (18a) the mesh-containing basin and (18b) the meshless basin. These two components interlock with each other. In this embodiment, the meshless basin is slightly less wide than the mesh-containing basin. The lips of the meshless basin are also slightly above those of the mesh-containing basin. Therefore the meshless basin fits into the mesh-containing basin and slides over it. The meshless basin's lips slide over the mesh-containing basin's lips. This allows the two basins to interlock with each other to make the pan. Both the meshless basin and the mesh-containing basin involve areas that are shaped approximately like the letter "U" with 90 degree angles on the corners. Both the meshless basin and the mesh-containing basin have a dipped shape which leaves a large potential air space. Both basins also have diagonal upward-sloping areas on their ends. The mesh-containing basin has the vent screen on its end, and the meshless basin has a solid wall sloping diagonally upward on its end. This is the air direction panel (21). This version of the solar panel module has an upper vent (20), so there is a slight gap between the top of the air direction panel and the tops of the two long walls of the pan.

The lips of the pan are slightly higher on the right side than the left side, so that the right lips of the mesh-containing basin and meshless basin in one pan can slide over the left lips of the mesh-containing basin and meshless basin of an adjacent pan.

Two joists can be seen on the sides of the pan. The anchors are held by the screws to the upper panel, the lips of the pan, and the joist, and the anchors hold the upper panel on top of the air space in the pan.

"L" denotes the length of the pan, and "W" denotes the width. Both are shown here, so that the viewer can grasp the lengthwise and widthwise orientation of the pan.

Figure 4:
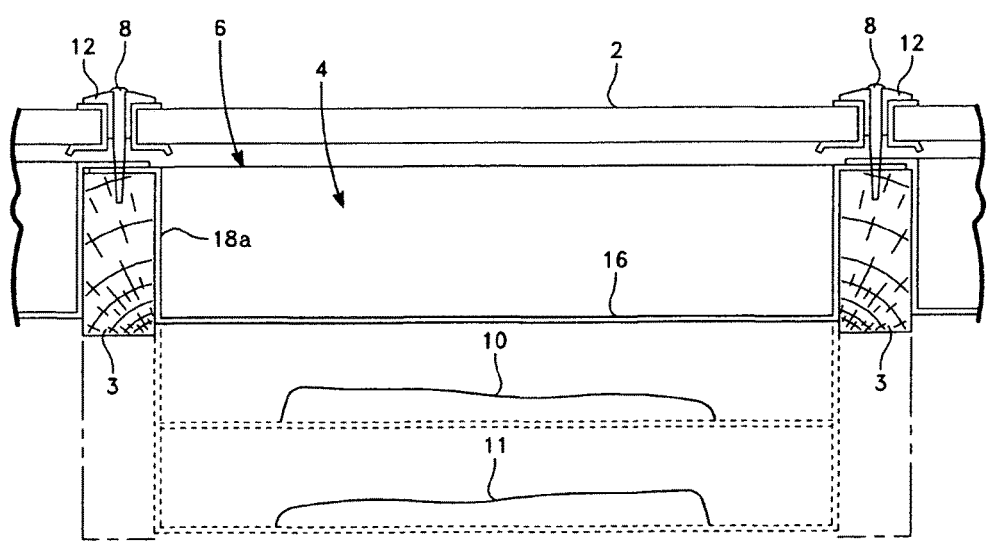
FIG. 4 is a cross-section of a solar panel module that is installed as the roof of a house.

FIG. 4 is a cross-section of a group of solar panel modules embodying one version of the invention that are installed as the roof of a house. In this version, the right lips of the both basins of each pan are slightly higher than the left lips. Anchors can be seen holding the upper panels. Each anchor also protrudes into one of the joists (3) and through the lips of two trays. It therefore holds the upper panel and tray of a module together, and holds them both to the joist. Cross-sections of upper panels can be seen.

Each of the anchors has indents that grip the ends of the upper panels next to that anchor. The area across the anchor directly between the beginning of one indent and the end of the other is ⅝ of an inch in this embodiment.

A cross-section of the tray is also visible below the upper panel. The viewer can see the lips of different trays, and also see how the right lips of each tray are slightly higher than the left lips of that tray. The right lip of each tray rests on top of the left lips of the tray to the immediate left. These lips, and the trays, are held in place by the anchor protruding through them. Insulation patches (11) are below the batteries.

Figure 5:
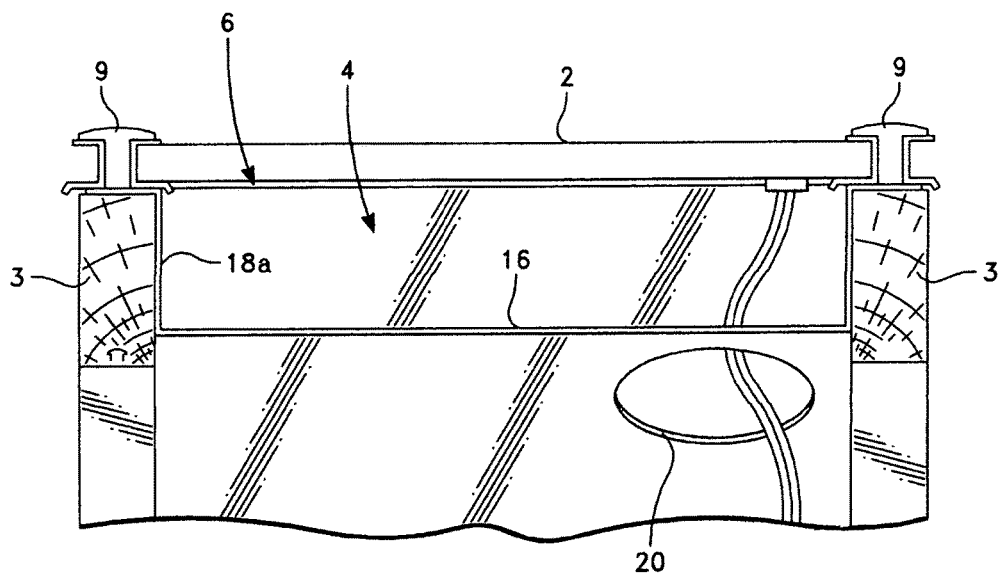
FIG. 5 is a cut-away view of part of a solar panel, showing the upper opening and other components.

FIG. 5 shows a close-up of a cut-away view of the back part of one of the pans of an embodiment of the invention. The main wires (26) are indicated, and in this embodiment of the invention, they go through the upper opening (20) to contact the electrical system of the rest of the structure. The Upper Opening (20) can also be seen. An air current will come out of the upper opening to spin one of the blades of a nearby wind turbine. A representation of a wind turbine in broken lines is shown nearby, to indicate its position, so the user can see how air would flow through the upper opening into the air turbine. Cross-sections of the upper panel (2) and lower panel (16) are shown. The air direction panel (21) helps direct the air current through the upper opening (20). Cross-sections of parts of screws (8) can be seen. The top of an anchor (12) is also visible, and the screws are screwed into the anchor.

Figure 6:
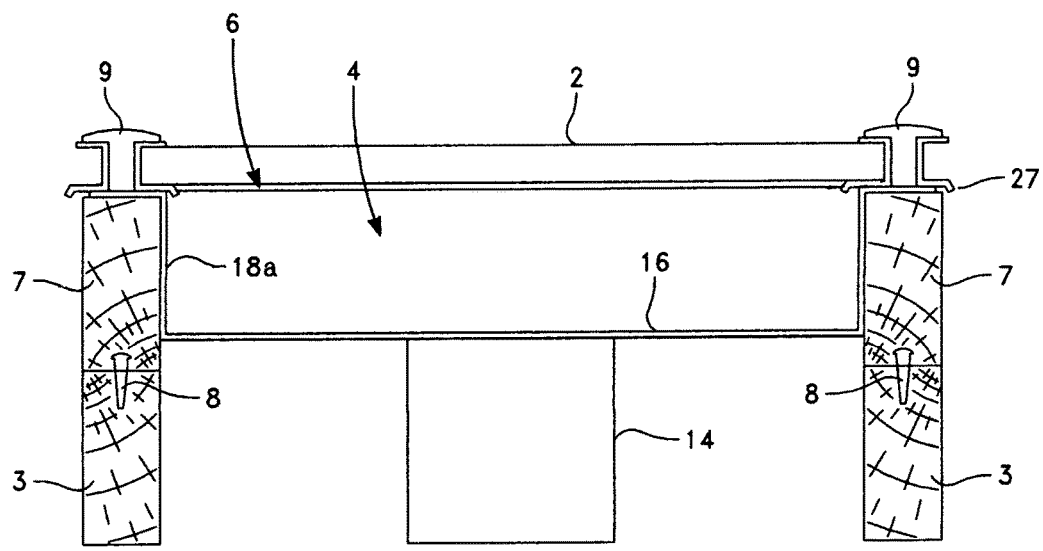
FIG. 6 is a view of a different embodiment of the invention, using anchor strips.

FIG. 6 shows an embodiment of the invention where the lips of the pan are placed on length beams (7) that are not part of the underlying structure, but are laid on top of it. This version also has anchor strips placed on top of the lips of the pans. These are different from the anchors, because an anchor is a complete piece involving two indents on opposite sides of the anchor, each of which is capable of holding the end of an upper panel. The anchor strips, by contrast, must be connected to straighteners. The straighteners are the component that grips the ends of the upper panel. The pan is on top of a bearing member (14).

The invention claimed is:

1. A solar panel module comprising a photovoltaic panel called an upper panel, and also comprising a pan;
   where said pan contains a central air space (4), in between said upper panel and the inside bottom of said pan, and said pan has a dipped shape with two long sides that dip towards the bottom of the pan, and two short sides that also dip towards the bottom of the pan, with the central air space in between the two long sides and in between the two short sides;
   wherein said pan has a trapezoidal shape, with said two long sides, and said two short sides comprising the sides of the trapezoidal shape;
   and where said upper panel fits on top of said pan, and is attached to said pan, wherein solar radiation can directly hit said upper panel, and then be fully or partially absorbed by said upper panel,
   and one short side of said pan comprises a vent screen through which air can flow into said air space,
   and the other short side of said pan comprises an air direction panel (21) through which air cannot flow,
   wherein said upper panel converts some or all of the solar radiation absorbed by said upper panel to electrical energy, generating electricity;
   wherein the distance between the bottom of said upper panel and the bottom of said pan is sufficient that a second solar panel can be held on top of the bottom of said pan;
   said solar panel module further comprising a photovoltaic panel that is a lower panel (16) which is located on, and fits on, the bottom of said pan, below said air space (4);
   wherein solar radiation that is not absorbed by said upper panel can propagate through said upper panel and said air space to reach said lower panel, and where said lower panel generates electricity by absorbing, and converting to electrical energy, some or all of the solar radiation reaching said lower panel;
   wherein the pan of said solar panel module is divided into at least two basins, including one mesh-containing basin (18a) and one or more meshless basins (18b), where one of the sides of said mesh-containing basin includes the vent screen, and where one of the sides of one of said meshless basins forms the air direction panel,
   and where said basins are each formed in a way that allows the basins to fit together, to form the pan; with parts of each of said basins contacting at least one other of said basins;
   wherein said mesh-containing basin (18a) has a right lip and a left lip and each said meshless basin (18b) has a right lip and a left lip, where the right lip and left lip of said mesh-containing basin (18a) project outward from the right and left sides of said mesh-containing basin, respectively, and the right lip and left lip of each said meshless basin (18b) project outward from the right and left sides of said meshless basin, respectively, and the right lip of said mesh-containing basin contacts the right lip of at least one said meshless basin and the left lip of said mesh-containing basin contacts the left lip of at least one said meshless basin
   wherein the mesh-containing basin within said pan and every meshless basin within said pan are directly or indirectly connected, via parts of each two adjacent basins fitting together, or interlocking, or being connect by snap-fits, by hooks, or by another means of binding said mesh-containing basin and each said meshless basin together;
   wherein the right lip of said mesh-containing basin (18a) and the right lip of each said meshless basin (18b) are approximately parallel, and the left lip of said mesh-containing basin (18a) and the left lip of each said meshless basin (18b) are approximately parallel,
   wherein, each basin is adjacent to at least one other basin within said pan, wherein, for all but one basins within said pan, the bottom of the right lip of each said basin is at the same height as the top of the right lip of an adjacent basin; and the bottom of the left lip of said basin is at the same height as the top of the left lip of an adjacent basin;
   wherein, the right lip of each mesh-containing basin within said pan can interlock with the right lip of another basin that is also part of said pan and borders on said mesh-containing basin; and the right lips of all but one meshless basins within said pan can each interlock with the right lip of a second basin which is a part of said pan, and borders on said meshless basin;
   wherein, within each pan, the left lip of each mesh-containing basin within said pan can interlock with the left lip of another basin that is also part of said pan and borders on said mesh-containing basin; and the left lips of all but one meshless basins within said pan can each interlock with the left lip of a second basin which is a part of said pan, and borders on said meshless basin;
   allowing all of the meshless basins and the mesh-containing basin to interlock with each other in a continuous pan;
   wherein an array of said solar panel modules is sufficiently strong to serve as a roof of a building;
   wherein said solar panel module is held in place by being gripped by means of holding;
   wherein each said means of holding is capable of holding at least two said solar panel modules;
   and each means of holding is fastened directly to a piece of the underlying structure beneath the roof.

2. A solar panel module comprising a photovoltaic panel called an upper panel, and also comprising a pan;
   where said pan contains a central air space (4), in between said upper panel and the inside bottom of said pan, and said pan has a dipped shape with two long sides that dip towards the bottom of the pan, and two short sides that also dip towards the bottom of the pan, with the central air space in between the two long sides and in between the two short sides;
   wherein said upper panel fits on top of said pan, and is attached to said pan,
   wherein solar radiation can directly hit said upper panel, and then be fully or partially absorbed by said upper panel,
   wherein one short side of said pan comprises a vent screen through which air can flow into said air space,
   and the other short side of said pan comprises an air direction panel (21) through which air cannot flow,
   wherein said upper panel converts some or all of the solar radiation absorbed by said upper panel to electrical energy, generating electricity;

wherein the distance between the bottom of said upper panel and the bottom of said pan is sufficient that a second solar panel can be held on top of the bottom of said pan;

wherein the pan of said solar panel module is divided into at least two basins, including one mesh-containing basin (18a) and one or more meshless basin (18b), where one of the sides of said mesh-containing basin includes the vent screen, and where one of the sides of one of said meshless basins forms the air direction panel, and where said basins are each formed in a way that allows the basins to fit together, to form the pan; with parts of each of said basins contacting at least one other of said basins;

wherein said mesh-containing basin (18a) has a right lip and a left lip and each said meshless basin (18b) has a right lip and a left lip, where the right lip and left lip of said mesh-containing basin (18a) project outward from the right and left sides of said mesh-containing basin, respectively, and the right lip and left lip of each said meshless basin (18b) project outward from the right and left sides of said meshless basin, respectively, and the right lip of said mesh-containing basin contacts the right lip of at least one said meshless basin and the left lip of said mesh-containing basin contacts the left lip of at least one said meshless basin;

wherein the mesh-containing basin within said pan and every meshless basin within said pan are directly or indirectly connected, via parts of each two adjacent basins fitting together, or interlocking, or being connect by snap-fits, by hooks, or by another means of binding said mesh-containing basin and each said meshless basin together;

wherein the right lip of said mesh-containing basin (18a) and the right lip of each said meshless basin (18b) are approximately parallel, and the left lip of said mesh-containing basin (18a) and the left lip of each said meshless basin (18b) are approximately parallel, wherein an array of said solar panel module is sufficiently strong to serve as a roof of a building;

wherein said solar panel module is held in place by being gripped by means of holding;

wherein each said means of holding is capable of holding at least two said solar panel modules;

and each means of holding is fastened directly to a piece of the underlying structure beneath the roof;

wherein the top of one member of a group comprising the left lip of each meshless basin and the right lip of said meshless basin is at the same height as the bottom of the other member of the group comprising the left lip of said meshless basin and the right lip of said meshless basin;

and the top of one member of a group comprising the left lip of the mesh-containing basin and the right lip of the mesh-containing basin is at the same height as the bottom of the other member of the group comprising the left lip of the mesh-containing basin and the right lip of the mesh-containing basin.

3. The solar panel module of claim 2, further comprising two main wires, of which one main wire is positive voltage and one main wire is negative voltage, where said main wires will be operatively connected to every solar panel in said solar panel module, via waterproof connections, where said connections allows said main wires to receive electrical energy produced by said solar panels, and said two main wires will emanate out of said solar panel module, and will transport electricity produced by said solar panel module to another location.

4. The solar panel module of claim 2, further comprising one or more of the following;
   a) a prism sheet either on top of, or immediately beneath, the upper panel, where said prism sheet diffracts the light reaching said prism sheet before said light reaches said upper panel;
   b) said upper panel comprises spray-on photovoltaic panel material;
   c) said lower panel comprises spray-on photovoltaic panel material.

5. The solar panel module of claim 2, further comprising one or more of the following;
   a) that said upper panel is a solar panel with multiple pillars in the light collection area of said solar panel, where each said pillar is designed to absorb a percentage of the solar radiation hitting said pillar, and a higher percentage of the solar radiation of certain wavelengths hitting said pillar than other wavelengths hitting said pillar;
   b) that said lower panel is a solar panel with multiple pillars in the light collection area of said solar panel; where each said pillar is designed to absorb a percentage of the solar radiation hitting said pillar, and a higher percentage of the solar radiation of certain wavelengths hitting said pillar than other wavelenghths hitting said pillar;
   c) one or more photovoltaic panels that are intermediate panels, which are placed in between the upper panel and the lower panel, and inside the pan, where said intermediate panels are oriented in a manner where they can receive solar radiation which penetrates said upper panel, and is not absorbed by said upper panel; and where said intermediate panels are operatively connected to the two main wires so that electricity generated by the intermediate panel(s) can be transmitted via the main wires;
   d) that one or more of said intermediate panels is a solar panel with multiple pillars in the light collection area of said solar panel; where each said pillar is designed to absorb a percentage of the solar radiation hitting said pillar, and a higher percentage of the solar radiation of certain wavelengths hitting said pillar than other wavelengths hitting said pillar.

6. The solar panel module of claim 2, further comprising one or more of the following;
   a) length beams (7) that are placed at the left and right sides of the pan of the solar panel module, where the length beam placed on the left side of the solar panel module is below the left lips of the mesh-carrying basin and meshless basins, and where the length beam placed on the right side of the solar panel module is below the right lips of the mesh-carrying basin and meshless basins;
   b) anchor strips that are fastened, via screws or another method, to said lips, where said anchor strips help to bind said solar panel module to the length beams or to the underlying structure.

7. The solar panel module of claim 2, wherein the pan is comprised of one or more of a group comprising aluminum, plastic, glass, other constituted products, and fiberglass.

8. A system for generating electricity, comprising the solar panel module of claim 2, further comprising an upper opening in either the top panel or the air direction panel, through which air that flows into the central air space (4) can flow out of the central air space (4), and said system further comprising a wind turbine (15) where said wind turbine generates electricity when aid flows through said wind turbine, and where said wind turbine is positioned at a location where air flowing out of the central air space (4) flows through the wind turbine (15).

9. A system for generating electricity, comprising an array of the solar panel modules of claim 2,
and further comprising anchors, and means of fastening;
each said anchor being a component fastened to a joist, and each anchor having sufficient strength to hold and support the edges of an upper panel;
so that two said anchors can hold and support the opposite edges of an upper panel, so that said upper panel will be held in place in a stable manner;
wherein;
each anchor is fastened either directly or indirectly to a joist of the underlying structure;
and wherein each said solar panel module is laid with said solar panel module's lips resting on the joists of the underlying structure and said solar panel module's central air space in between two said joists;
and wherein said solar panel modules are placed in positions where solar radiation will hit said upper panels, allowing said upper panels to generate electricity;
wherein the opposite edges of the upper panel of each solar panel module are held by two anchors;
wherein the lips of each solar panel module may be laid on a joist and also laid on top of other lips of one or more other solar panel modules when said other lips are also laid on said joist, creating one continuous stack of solar panel module lips laid on said joist;
and said system further comprising that each said anchor is fastened by a means of fastening to a joist, and to the lips of any pans that where said lips are on top of that joist.

10. The system of claim 9, wherein the means for fastening each anchor to a joist comprises one or more of a) screws that are driven through the anchor, through the lips of any solar panel modules where said lips are immediately below said anchor, and driven into said joist,
and b) each anchor includes a peglike component that is driven through the lips of any solar panel modules where said lips are immediately below said anchor; and into said joist.

11. The system of claim 9, further comprising that each solar panel within each said solar panel module is connected to one or more batteries, via a connection that allows electricity to be transferred directly or indirectly from said solar panel module to said battery, where said battery has the ability to store electricity produced by said solar panel module.

12. The system of claim 11, further comprising a second platform, which is supported by at least two of the joists, and attached either directly or indirectly to these at least two joists, and wherein said batteries are located on said second platform.

13. The system of claim 11, wherein the main wires of said solar panel modules are encased in the wall of the pan, and further comprising that said main wires reach an additional waterproof chamber below the lower end of the pan, which houses components including, but not limited to, inverters, connections to said batteries, and connections to any underlying electrical power grid.

14. The system of claim 9, further comprising LED lights located on the undersides of the upper panels.

15. The system of claim 9, wherein the screen intake (5) of each solar panel module can be removed for the purpose of cleaning the pan of that solar panel module, and then placed back in said screen intake's former position.

16. The system of claim 9, wherein the array of solar panels is above a group of plants, and the array of solar panels either fully or partially control the amount of solar radiation of different wavelengths that reach said plants.

* * * * *